April 9, 1968          E. C. CRIPE          3,377,100
VERTICALLY EXPANDABLE VEHICLE
Filed June 28, 1966          3 Sheets-Sheet 1
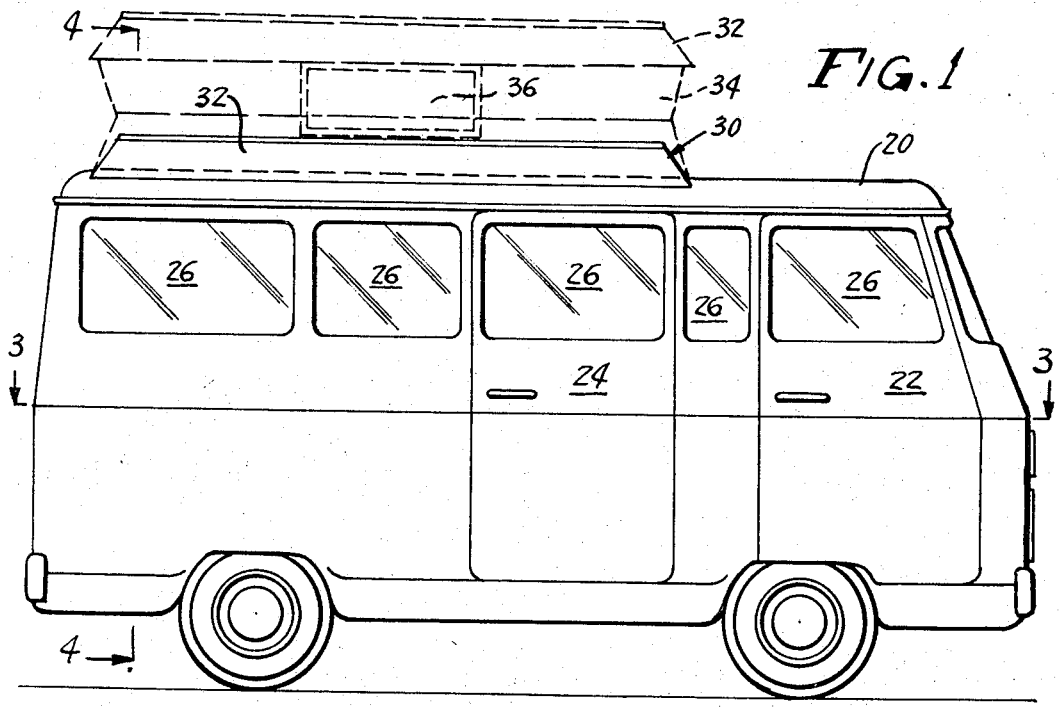
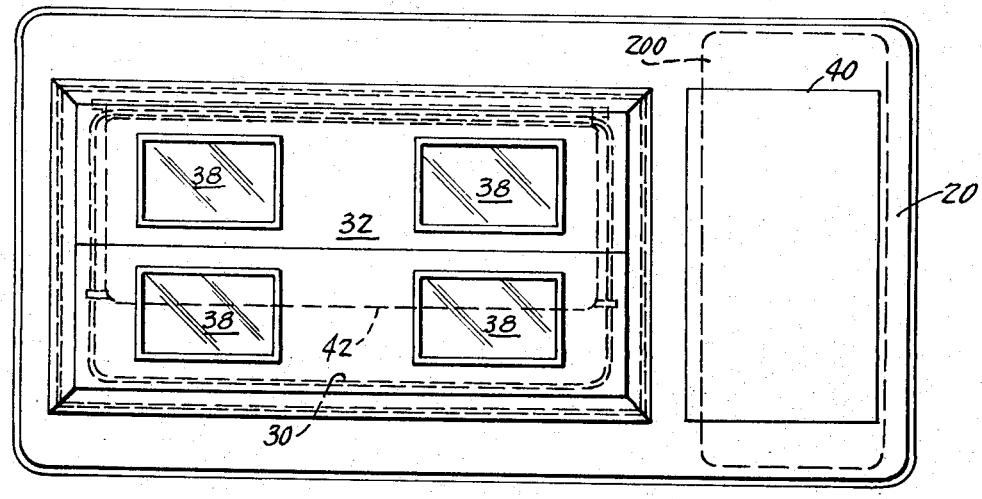
INVENTOR.
EARNEST C. CRIPE
BY *Kimmel, Crowell & Weaver*
ATTORNEYS.

April 9, 1968
E. C. CRIPE
3,377,100
VERTICALLY EXPANDABLE VEHICLE
Filed June 28, 1966
3 Sheets-Sheet 2
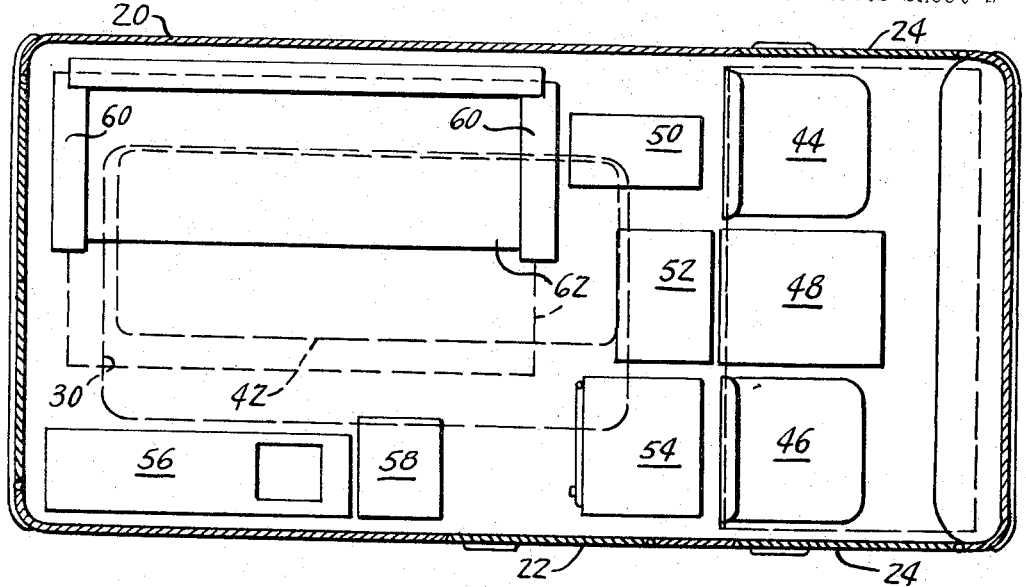
FIG. 3
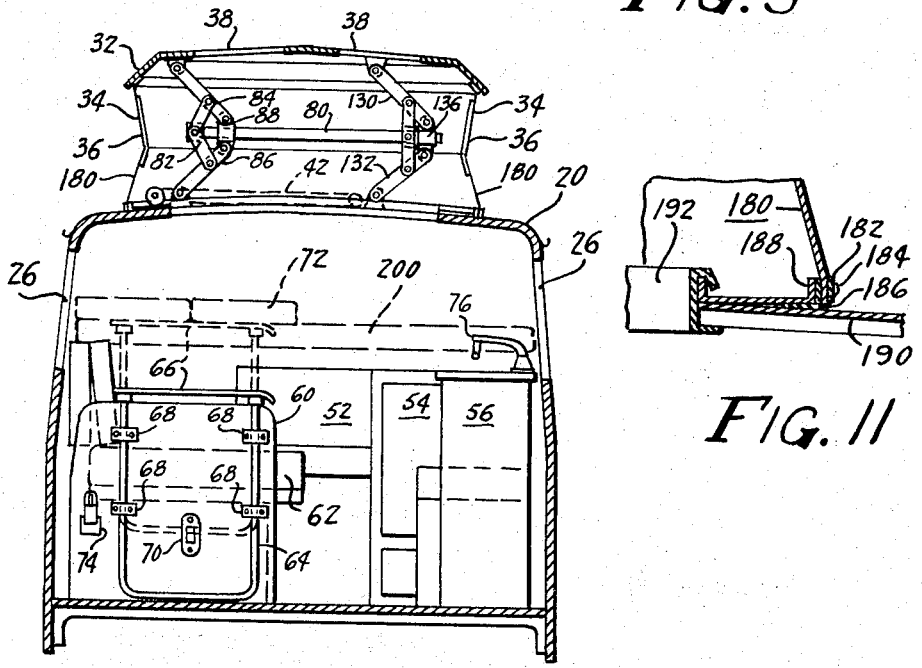
FIG. 4
FIG. 11
INVENTOR.
EARNEST C. CRIPE
BY Kimmel, Crowell & Weaver
ATTORNEYS.

April 9, 1968  E. C. CRIPE  3,377,100
VERTICALLY EXPANDABLE VEHICLE
Filed June 28, 1966  3 Sheets-Sheet 3

INVENTOR.
EARNEST C. CRIPE
BY *Kimmel, Crowell & Weaver*
ATTORNEYS.

United States Patent Office 3,377,100
Patented Apr. 9, 1968

3,377,100
VERTICALLY EXPANDABLE VEHICLE
Earnest C. Cripe, 2514 S. Main St.,
Goshen, Ind. 46526
Filed June 28, 1966, Ser. No. 561,193
7 Claims. (Cl. 296—137)

ABSTRACT OF THE DISCLOSURE

A vertically expandable vehicle with scissors expanding mechanism, comprising the vertically movable portion upwardly, foldable side walls between the movable portion and the body of the vehicle, and biased means for folding the side walls at an intermediate point to cause such side walls to fold automatically when the movable portion is lowered is described.

This invention relates to a self-propelled vehicle having means in the roof thereof for vertically expanding the space of the vehicle, means for causing said expansion, and means for utilizing the additional space efficiently. In particular, this invention is directed to a novel roof expanding structure, means for causing the roof to expand, expanded portion side wall construction, and bedding or bunk arrangement in the vehicle.

It is contemplated that the self-propelled vehicle of this invention will have many uses such as a field office for architects and consulting engineers and contractors, traveling conference room for executives, sales office and as mobile offices for professional as well as all types of industrial, commercial and sales consultants. It is therefore an object of this invention to provide a self-propelled vehicle expandable to provide adequate space for desk and chair, drawing table, file cabinet, storage cabinet, typewriter stand, gas or electric heater, air conditioner, and other equipment as may be desirable for an office for industrial, professional, commercial and sales use.

It is also often highly desirable to have a self-propelled vehicle which includes therein the means necessary for traveling in comfort such as adequate space, beds, kitchen facilities and adequate storage space.

It is an object of this invention to provide a self-propelled vehicle which is vertically expandable to provide adequate head room and means for efficiently using the space in the vehicle.

It is a further object of this invention to provide a novel expanding structure in a self-propelled vehicle.

It is a further object of this invention to provide a novel means for causing vertically expandable vehicles to expand.

It is also an object of this invention to provide a novel side wall construction for the expanded portion of a self-propelled expandable vehicle.

It is yet another object of this invention to provide a novel bed or bunk arrangement for accommodating a plurality of persons in a relatively small space.

It is a further object of this invention to provide a novel expandable self-propelled vehicle having in combination a rigid roof with flexible side panels, bunk supports and means for selectively raising and lowering the rigid roof. Other objects of this invention will become apparent from the following specification and from the drawings to which reference is made.

In the drawings,

FIGURE 1 is a side view of the vhicle of this invention showing the expandable portion in both its expanded and in its collapsed position;

FIGURE 2 is a top view of the vehicle of this invention showing the roof structure;

FIGURE 3 is a view of the interior arrangement of the vehicle shown in partial cross-section taken along line 3—3 in the direction of the arrows as shown in FIGURE 1;

FIGURE 4 is a vertical plan view of the interior of this invention taken approximately along line 4—4 of FIGURE 1;

FIGURE 11 is a detail of the interconnection of the side panels and the body of the vehicle of this invention;

Figure 6:
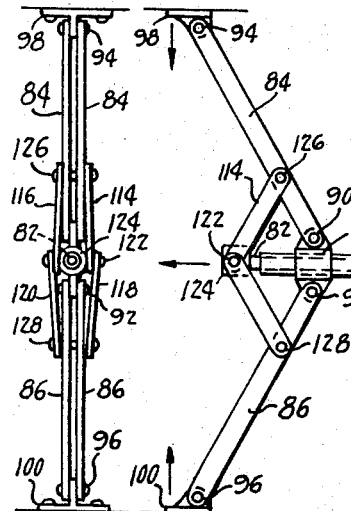
FIGURES 5, 6 and 7 are respectively side and end views of the novel mechanism for expanding the roof of this invention.

Reference is now made to FIGURE 1 of the drawings which shows the vehicle 20 of this invention. The vehicle may be of a standard type such as a Ford Econoline, the Volkswagen Microbus, the Chevrolet Greenbrier, Chevrolet regular van, Dodge regular van, similar van type vehicles, suburban carryalls, station wagons and similarly constructed vehicles. In the specific embodiment shown in the drawings as exemplary a Ford Econoline type vehicle is illustrated; however, it will be realized that the invention is not restricted to this type of vehicle.

The vehicle will be conventionally equipped with self-powering and control means, steering means, conventional doors such as doors 22 and 24, windows such as generally designated by 26 and lower standard vehicular equipment as is comonly known in the art.

An important feature of this invention resides in the novel roof structure shown generally at 30. The roof structure comprises a rigid roof 32, flexible side panels 34 for enclosing the expanded portion of the vehicle and, desirably, a window 36 in the side of the flexible side panels. As viewed from the top as in FIGURE 2, the rigid roof may include a plurality of windows designated generally as 38. These windows are in the form of skylights to provide lighting to the interior of the vehicle. Space may be provided in the vehicle, depending upon its type and construction, for a car top type carrier 40 in addition to expandable roof structure 30. As shown in the dotted lines of FIGURE 2, a bunk 42 may be supported in the expanded portion of the vehicle, as will be explained more fully hereinafter.

With reference now to FIGURE 3, the interior of the vehicle may be conventionally equipped with seats 44 and 46 and, in the particular type of vehicle illustrated, a motor well 48. In addition to the conventional equipment, the vehicle may be provided with a garment bag or wardrobe cabinet 50, a stove box 52 which may include the stove and its operating accessories and dishes, a refrigerator 54 which, in a preferred embodiment, may be a butane or propane operated or 110–12 volt combustion electric refrigerator. In addition, a sink cabinet 56 and a toilet box 58 may be provided. In a preferred embodiment, the vehicle includes a couch 60 which is convertible, as shown by the dotted lines indicated at 62, into a double bed. The aera occupied by the roof is shown by numeral 30 in FIGURE 3 and the area occupied by the bunk in the expanded area is shown by the dotted lines at 42.

An important feature of this invention resides in the means for providing sleeping space and facilities in the vehicle as shown best in FIGURE 4. The ends of couch 60 are provided with vertically adjustable bunk supports shown at 64. These supports, in a preferred embodiment, comprise a U-shaped rod having a support bracket 66 on the upper end thereof. Keepers 68 slidably receive the U-shaped rod 64 and a latch 70 is provided to maintain the support 64 in its upward position when desired. A bunk 72 is supported on the upper bracket 66. It will be understood, of course, that a similar construction is provided at the other end of the couch. A latch 74 is provided on the end of the couch for holding equipment in place in the vehicle.

As shown in FIGURE 4, bunk 42 is positioned in the extended area shown above the normal vehicle roof.

As is also shown in FIGURE 4, sink 56 may include water storage facilities and water outlet facilities shown at 76.

An important facet of this invention resides in the scissors type elevating mechanism for selectively lifting the rigid roof from its normal relationship with the body to a predetermined distance above the body as shown in FIGURE 4 and shown in greater detail in FIGURES 5 through 10 to which reference is now made. The scissors type elevating mechanism comprises a central tube 80 and a rod 82 slidably received therein. Arms 84 and 86 are pivotally connected by means of a clamp 88 and pins 90, 92 to tube 80. The distal ends of arms 84 and 86 are pivotally connected by pins 94 and 96 and brackets 98 and 100 to the rigid roof and to the body respectively. FIGURE 6A is a detail of the type of bracket used to connect the arms to the body and to the roof. The bracket comprises a plate 102 which may be secured to the roof 32 by any desirable means such as by bolts, pins, rivets, glue or other fasteners. The plate 102 carries upon it a protrusion 104 having an aperture 106 therein through which a pin 108 extends to secure the arm, for example 84, to the bracket. A shoulder portion 110 is provided which coacts with the corner 112 of the arm to stop further movement when the roof is fully extended.

Rods 114, 116, 118, and 120 are pivotally connected by pin 122 through sleeve 124 to rod 82 to provide moving force and support to arms 84 and 86 in a manner to be described. Rods 114 and 116 are pivotally connected by pin 126 to arm 84 and rods 118 and 120 are connected by pin 128 to arm 86.

Arms 130 and 132 are connected by means of pins 134 and 136 to clamp 138 which is rigidly secured to tube 80 at its other end. Arms 130 and 132 are connected respectively by pins 140 and 142 to brackets 144 and 146 to the roof and body of the vehicle. Locking bars 148 and 150 are pivotally connected at their distal ends by pins 152 and 154 to arms 130 and 132 respectively and by pin 156 to collar 158 which is slidably received on the outside of tube 80. Locking bars 148 and 150, as shown in FIGURE 5, lock the elevator in its most expanded position by slipping collar 158 just past its center point along rod 80 against clamp 138.

Locking bars 160 and 162 are connected in the same manner as locking bars 148 and 150 and operate similarly.

Figure 5:
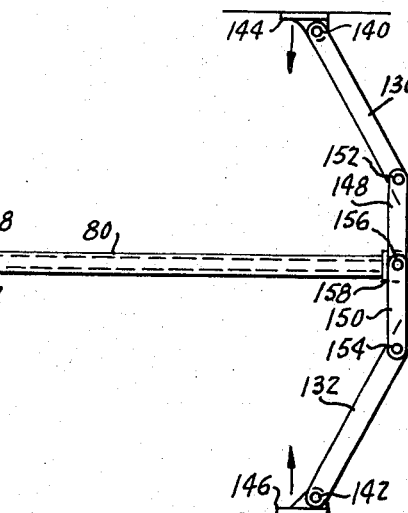
Figure 7:
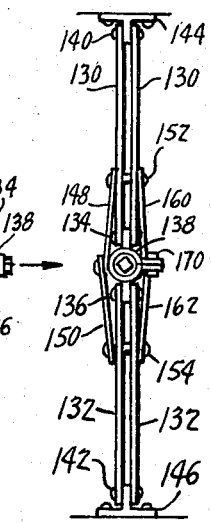
Figure 8:
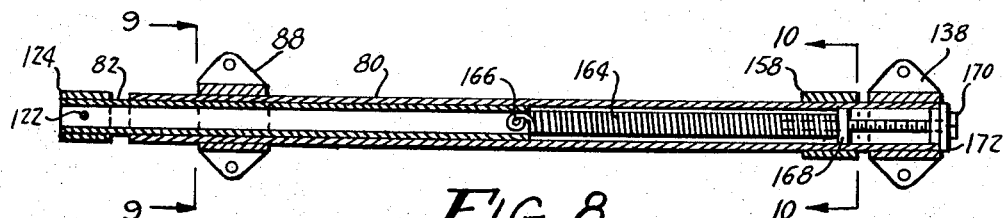
FIGURE 8 is a cross-sectional view of the main support and bias mechanism of the expanding device of this invention.
Figure 6A:
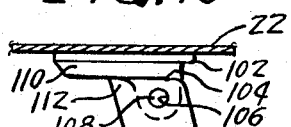
FIGURE 6A is a detail of the bracket used to connect the arms to the body and to the roof.

Rod 82 is biased inwardly in tube 80 by spring 164, as best shown in FIGURE 8, and is attached by a frictional fastener 166 to rod 82 at one end and includes threaded nut or similar means 168 at its other end which threadably receives bolt 170, shown also in FIGURES 5 and 7, which passes through an end washer retainer 172 in tube 80. It will thus be seen that the tension of spring 164 can be varied by adjusting the position of bolt 170 relative to its threaded receiving means 168. It will be seen from the drawings that the left end, as shown in FIGURE 5, of the rod 82 is biased toward the right end of tube 80. This biasing force, exerted by spring 164, assists in raising the rigid roof and substantially and importantly reduces the amount of force necessary to expand the vehicle tube in order to lower the vehicle, collar 158 is slid to the left on tube 80 breaking lock toggle arrangement of rods 148 and 150 and the roof is merely pulled down and locked into its sealing relationship with the body.

Figure 9:
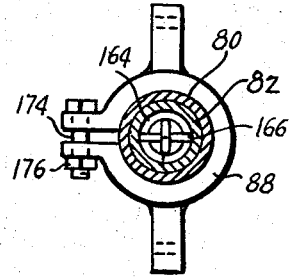
FIGURE 9 is a view in partial cross-section of one end of the main support mechanism taken substantially along line 9—9 in the direction of the arrows as shown in FIGURE 8.
Figure 10:
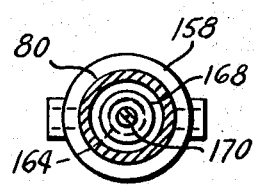
FIGURE 10 is an end view of the other end of the main support mechanism of the expanding device of this invention taken substantially along line 10—10 in the direction of the arrows as shown in FIGURE 8.

With reference to FIGURE 9 which shows clamp 88 in greater detail, it will be seen that clamp 88 is secured to tube 80 by a bolt 174 and a nut 176 or other similar fastening means.

Figure 12:
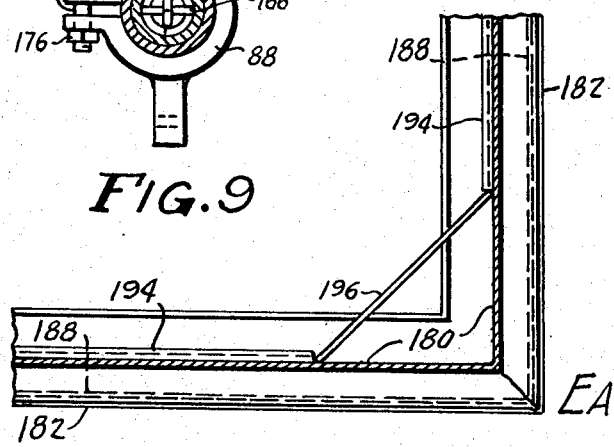
FIGURE 12 is a top view of the means for automatically folding the side panel of this invention when the roof is closed.

Reference is now made to FIGURES 11 and 12 which in greater detail disclose the flexible side panel arrangement and connection of this invention. FIGURE 11 shows the connection of the side panel to the body in detail. The side panel 180 is connected by a strip 182 and pin, screw, or other frictional fastening means 184 through a sealing strip 186 to a sealing bracket 188. In a preferred embodiment, the sealing bracket 188 may be secured to the body 190 by a channel bracket 192. In other embodiments it may be desirable to use rivets, bolts, or other fastening means to secure the sealing bracket to the body to provide a waterproof seal at the edge.

An additional important facet of this invention is shown in FIGURE 12. The side panel 180 is of a flexible material, such as a high quality marine grade vinyl and nylon, secured at its lower edge in the the manner shown in FIGURE 11 and in similar manner at its upper edge. Webbing 194 is shown along the line intermediate the top and bottom of the curtain to provide a fold or break line for the side panel or curtain. An elastic band 196 or other resilient material interconnects across the corners of the side panel 180. It will thus be seen that when the rigid roof of the expandable vehicle is lowered, the flexible panels are automatically folded inwardly in response to the action of resilient member 196 and along the line provided by webbing 194.

Any material suitable for vehicle construction may be used in this invention. For example, the roof may be made of aluminum, steel, molded plastic or fiber glass resin construction and may include skylights or windows of any desired transparent or translucent material, such as acrylic plastics and others. The windows in the sides of the expanded portion designated 36 in FIGURE 1, may be made of a fiber glass screen, or other material which is resistant to wear and corrosion.

An important feature of this invention resides in the poistion of the bunk in the expanded portion of the vehicle. This upper bunk is always available since it is anchored on the one side to the body and stored within the roof construction itself. It may be unrolled, in a preferred embodiment, to the position shown in FIGURE 4 and supported in position therein by the body.

It will be seen that the vehicle of this invention not only provides additional space inside the vehicle by means of its vertically expanding roof but in addition provides for efficient and ready use of the space in the vehicle by providing additional sleeping space in the form of bunks or beds. In addition to the bed or bunk areas which have been described, an additional bunk may be provided over the driver's area in the vehicle used as exemplary of this invention. Such a bunk is designated by numeral 200 as shown in FIGURE 2. Of course, the availability of this space depends in part upon the type of vehicle being used.

It will be seen that the vehicle of this invention has significant advantages to families and to groups of individuals who wish to travel into the less populated park and forest areas of our country where motel and hotel facilities are not readily available. Other advantages will become apparent to those skilled in the art and to those who use the vehicle.

It will be understood that the invention has been described with respect to specific embodiments and to specific structures; however, modifications thereof may be made without departing from the spirit of this invention.

The scope of this invention is limited only by the appended claims.

I claim:
1. A self-propelled expandable vehicle comprising:
a body;
a rigid roof for the body;
scissors type elevating means for selectively lifting the roof from contact with the body to a predetermined height above the body and for lowering the roof into sealing contact with the body;
flexible side panels having corners, said side panels extending from the edge of the roof to the body for enclosing the expanded portion of the vehicle; and
resilient means secured across the corners of the side panels biasing an intermediate portion of said side panels inwardly for automatically folding the side panels inwardly along the predetermined line intermediate the body and the roof when the roof is forward.

2. The vehicle of claim 1 wherein the scissors type elevating means includes bias means for urging the roof upwardly and means for adjusting the force exerted by the bias means.

3. The vehicle of claim 1 further including window skylights in the roof.

4. The vehicle of claim 1 further including means for supporting a bunk in the expanded portion and a bunk supported in the expanded portion.

5. The vehicle of claim 1 further including a convertible couch, means for converting the couch into a double bed, adjustable support means on the end of the couch for supporting a bunk and a bunk supported by the adjustable bunk means.

6. A self-propelled expandable vehicle comprising a body,
a rigid roof for the body,
upwardly biased means for selectively lifting the roof from contact with the body to a predetermined height and for lowering the roof into sealing contact with the body at will,
flexible side panels having four corners extending from the edge of the roof to the body for enclosing the expanded portion of the vehicle, and
resilient means secured across the corners of the side panels for automatically folding the side panels inwardly along a predetermined line intermediate the body and the roof when the roof is lowered.

7. The vehicle of claim 6 wherein the flexible side further includes window sections therein, the roof further includes window sections therein, the means for selectively lifting the roof comprises a pair of scissors elevators each of which comprises an elongate tube, a rod slidably received in the tube, spring bias means secured at one end to the rod, said spring being received in the tube, means on the other end of the tube for adjusting the tension of the spring, a first arm pivotally secured to the tube at one end and to the roof at the other end, a second arm pivotally secured to the tube at one end and to the body at the other end, a third arm pivotally and slidably engaged with the tube at one end and connected to the roof at the other end, a fourth arm pivotally and slidably engaged with the tube at one end and connected to the body at the other end, and means secured to the roof and body respectively at the ends of the arms for limting the movement of the arms with respect to the roof and body; and further including means for supporting a bunk in the expanded portion, a convertible couch in the vehicle, and vertically adjustable supports on the end of the couch for supporting a bunk above the couch.

References Cited

UNITED STATES PATENTS

| | | | |
|---|---|---|---|
| 2,531,140 | 11/1950 | Linde | 296—100 |
| 3,048,438 | 8/1962 | Koch et al. | 296—27 |
| 3,160,435 | 12/1964 | Smith | 296—23 |
| 3,179,462 | 4/1965 | Hagen | 296—23 |

FOREIGN PATENTS 839,158  6/1960  Great Britain.

LEO FRIAGLIA, *Primary Examiner.*

BENJAMIN HERSH, *Examiner.*

J. E. SIEGEL, *Assistant Examiner.*